(12) United States Patent
Weiblen et al.

(10) Patent No.: US 6,354,153 B1
(45) Date of Patent: Mar. 12, 2002

(54) PRESSURE SENSOR CONNECTION DEVICE

(75) Inventors: Kurt Weiblen, Metzingen; Tore Toennesen, Tübingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/603,074

(22) Filed: Jun. 26, 2000

(30) Foreign Application Priority Data

Jun. 24, 1999 (DE) .......................... 199 28 917

(51) Int. Cl.⁷ .................................. G01L 7/00
(52) U.S. Cl. ........................................ 73/756
(58) Field of Search .................. 73/706, 756, 718, 73/724; 338/4, 42; 29/610.1, 621.1

(56) References Cited

U.S. PATENT DOCUMENTS 4,918,833 A * 4/1990 Allard et al. ............. 29/621.1

FOREIGN PATENT DOCUMENTS

DE 43 34 123 4/1995

* cited by examiner

*Primary Examiner*—William Oen
(74) *Attorney, Agent, or Firm*—Kenyon & Kenyon

(57) ABSTRACT

A pressure sensor device has a mounting rack and a sensor casing arranged on the mounting rack and closed except for one opening. The pressure sensor includes a pressure pickup that is arranged inside the sensor casing and electrically connected to the mounting rack. Also included in the pressure sensor is a pressure connection which includes a connector and a pressure channel having an inlet and an outlet, with the pressure connection being designed as a molded part produced independently of the sensor casing and securable on the mounting rack. An outlet of the pressure channel designed on the molded part is connected at least indirectly to an opening in the sensor casing.

12 Claims, 2 Drawing Sheets

PRESSURE SENSOR CONNECTION DEVICE

FIELD OF THE INVENTION

The present invention relates to a pressure sensor.

BACKGROUND OF THE INVENTION

German Published Patent Application No. 43 34 123 describes a pressure sensor, in which a sensor casing containing a semiconductor pressure pickup such as a silicon chip is mounted on a printed circuit board as an SMD (surface mounting device) component. The sensor casing has a bottom part and a cover part, with a pressure connection being integrally molded on the bottom part of the sensor casing, this pressure connection having a connector for a pressure tubing, and a pressure channel arranged therein through which pressure can act on the semiconductor pressure pickup. With the known pressure sensor devices, the pressure connection is part of the sensor casing, so the sensor casing is always mounted together with the pressure connection on the mounting rack in assembling the sensor casing. In assembling other SMD components, the pressure connection projecting away from the mounting rack is often an obstacle. Another disadvantage is that it is impossible to perform a visual inspection of the soldered joints after establishing the electrical connection between the terminals of the sensor casing and the printed circuit board, because the respective instruments cannot be brought close enough to the soldered joints because of the pressure connection.

Customers have demanded that the connector for the pressure sensor projects either at the top or bottom of the mounting rack. Different demands are also made regarding the shape and design of the connector. With the known devices, the pressure connector is part of the sensor casing, so various complete systems with casing, pressure connector, semiconductor pressure pickup and all other components must be kept in stock for the different applications.

SUMMARY OF THE INVENTION

The disadvantages of the related art are avoided with the pressure sensor according to the present invention. With the device according to the present invention, the pressure connector is designed as a molded part produced independently of the sensor casing and securable on the mounting rack, where an outlet of the pressure channel designed on the molded part is connected at least indirectly to an opening in the sensor casing. This feature yields the advantageous result that the sensor casing can be mounted on the mounting rack independently of the pressure connector. Thus, sensors which are relatively simple to manufacture can be used to advantage, their very flat sensor casing having a carrier board and a cover part mounted on the carrier board with a bore provided in the cover part. Such sensors which are available for use as barometers do not have a pressure connector and can be acquired from the manufacturers relatively inexpensively. After automatic assembly and soldering of the sensor casing on the mounting rack, the soldered joints can be checked conveniently and additional SMD components and other components can be assembled on the mounting rack unhindered. After completion of the mounting rack, the pressure connector is attached to the mounting rack in such a way that the outlet of the pressure channel designed on the pressure connector is connected directly or indirectly to the opening of the sensor casing. This advantageously prevents damage to the pressure connector in soldering components to the mounting rack. In addition, securing the pressure connector to the mounting rack yields a simple and also very reliable method of mounting the pressure connector, because it is not attached merely to the sensor casing. This measure prevents a load from being applied to the soldered joints of the sensor when the pressure tubing is attached.

Thus, the connection between the pressure channel of the pressure connection and the opening in the sensor casing can be sealed easily by a sealing part arranged between the outlet of the pressure channel and the opening in the sensor casing. For this reason, the pressure connection may have a recess surrounding the outlet of the pressure channel with the sealing part inserted into this recess.

Fastening devices each designed as a locking device may advantageously be provided on the pressure connection for securing the pressure connection on the mounting rack. It is especially advantageous if the locking device can be engaged in recesses in the mounting rack in an insertion direction running perpendicular to the top side of the mounting rack provided with the sensor casing.

If the opening, in the sensor casing is arranged on the top side of the sensor casing facing away from the mounting rack, and if the outlet of the pressure channel is designed on a section of the pressure connection facing the mounting rack, then the sealing ring can advantageously be clamped between the sensor casing and the pressure connection in connecting the pressure connection. Therefore, the pressure connection has at least one elastically deformable spring arm which presses the sealing part against the sensor casing.

In another embodiment, the connector of the pressure connection is designed with an angle bend and passed through a passage in the mounting rack to the underside of the mounting rack facing away from the sensor casing. It is advantageous that this does not require modification of the sensor casing.

The pressure connection may advantageously be made of plastic, e.g., as a simple injection molded part.

DETAILED DESCRIPTION

Figure 1:
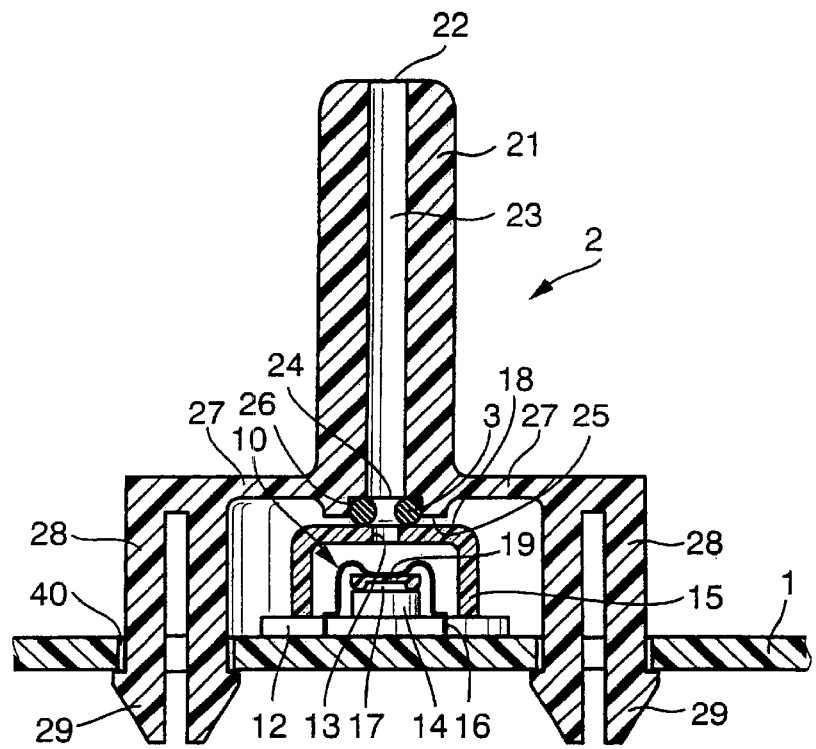
FIG. 1 shows a cross section through a first embodiment of the present invention.

FIG. 1 shows a mounting rack 1, e.g., a printed circuit board, a ceramic multilayer circuit, a punched grid or some other suitable mounting rack. A sensor casing 12, 15 containing a pressure pickup 10 is arranged on the top side of mounting rack 1. The sensor casing includes a bottom board 12 which in this embodiment is a ceramic carrier and a cap-like cover 15. Cover 15 and bottom board 12 form a cavity in which pressure pickup 10 is arranged. A pressure can be directed into the interior through an opening 13 in top side 18 of cover 15 which faces away from mounting rack 1. Pressure pickup 10 may include, for example, a silicon chip 19 provided with a recess 17 and arranged on a glass base 14 in such a way that recess 17 is hermetically sealed by glass base 14. A section of silicon chip 19 where the thickness of the material is reduced above recess 17 forms a deformable membrane. Due to piezoresistive elements (not shown) in the area of the membrane, mechanical stresses in the membrane can be detected and analyzed by electronic circuit parts arranged on silicon chip 19. Bond wires connect silicon chip 19 to pressure contacts 16 arranged in ceramic base board 12. Terminals (not shown) provided on the underside of base board 12 are electrically connected to plated-through holes 16. The terminals on the underside of base board 12 are soldered to printed conductors on the top side of mounting rack 1 as SMDs. To do so, the sensor casing, is applied to mounting rack 1 as an SMD together with other components and soldered to the mounting rack in a reflow process. However, there are also other conceivable embodiments where the sensor casing is soldered to terminal lugs on the mounting rack projecting, away from the underside or are mounted by push-through assembly or other known types of assembly of electric and electronic components on mounting racks.

As also shown in FIG. 1, pressure connection 2 is formed by a molded part produced separately from sensor casing 12, 15. For example, molded part 2 may be manufactured as a plastic injection molded part. However, other embodiments are also conceivable, where the molded part is made of another material, e.g., a metal. Pressure connection 2 has a connector 21 in which there is a pressure channel 23 with an inlet 22 and an outlet 24. Pressure channel 23 is preferably designed with a circular cross section. Outlet 24 is surrounded by a recess 26 having a sealing ring 3 made of rubber, for example, inserted into it. Two slotted locking pegs 28 are connected by elastically flexible spring arms 27 to connector 21. The ends of locking pegs 28 are provided with locking hooks 29. Locking hooks 29 are arranged on molded part 2 so that they project perpendicularly on the underside of the molded part having outlet 24 of pressure channel 23. In assembly, locking pegs 28 of pressure connection 2 are inserted into recesses 40 on mounting rack 1 until locking hooks 29 on the underside of the mounting rack engage and lock behind the edges of recesses 40. The distance from locking hooks 29 to sealing ring 3 is somewhat smaller than the distance from the underside of mounting rack 1 to top side 18 of the sensor casing, so that sealing ring 3 is pressed by the expansive force of elastically flexible spring arms 27 against top side 18 of the sensor casing in the area of opening 13, thus sealing the transitional area between pressure channel 23 and sensor casing 15.

Figure 2:
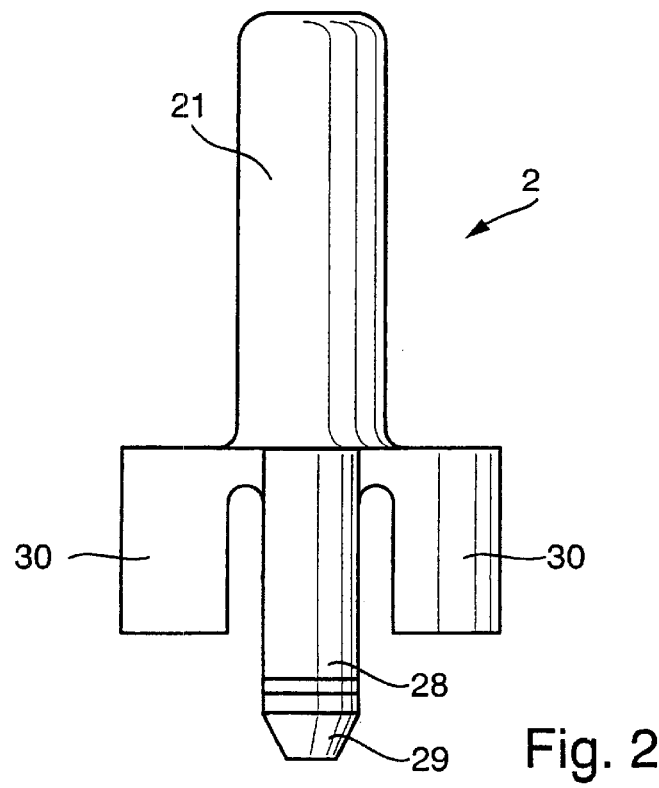
FIG. 2 shows a side view of the pressure connection from FIG. 1.

As shown in FIG. 2, pressure connection 2 is also supported on the top side of mounting rack 1 with two stops 30 at the side. Stops 30 provide an additional hold for the pressure connection on the mounting rack and limit the depth of penetration of the locking pegs when the pressure connection is attached. Thus, on the whole, an especially stable attachment of the pressure connection to mounting rack 1 is achieved.

Opening 13, recess 26, sealing ring 3 and pressure channel 23 are arranged coaxially with respect to one another in FIG. 1. However, instead of sealing ring 3, it is also possible to provide an adapter as a connecting device between pressure connection 2 and sensor casing 15. In this case, opening 13 need not be aligned with pressure channel 23. It is also possible to provide a sealing area on section 25 of the molded part, e.g., in the form of a peripheral elastically deformable rib, instead of elastic sealing ring 3. Other measures for sealing the transition from outlet 24 to opening 13 are also possible.

Figure 3:
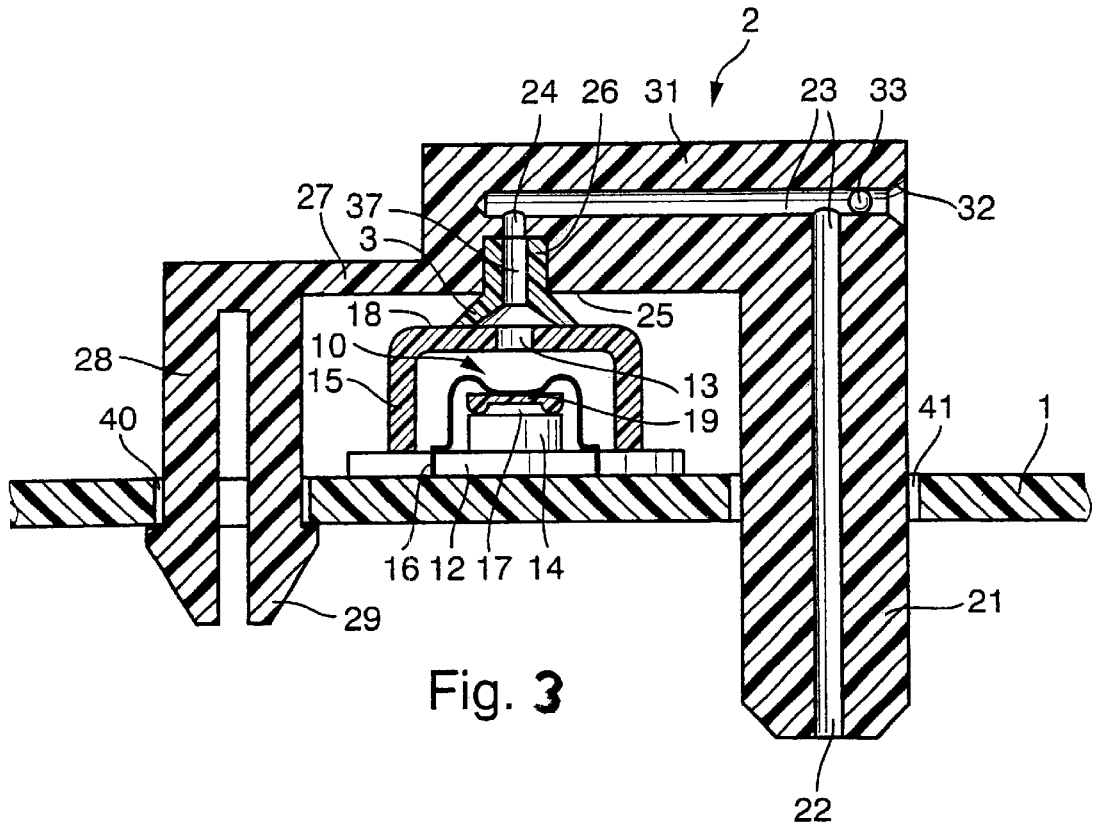
FIG. 3 shows a cross section through a second embodiment of the present invention.
Figure 4:
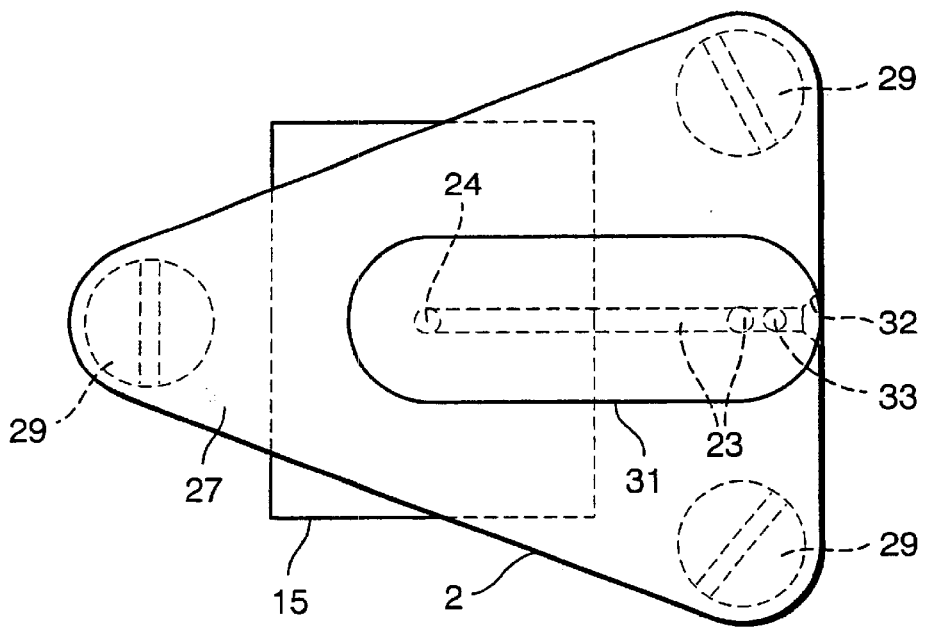
FIG. 4 shows a top view of the embodiment from FIG. 2.

FIGS. 3 and 4 show another embodiment of the present invention where the design of the pressure connection is slightly different. In contrast to FIG. 1, pressure channel 23 in the embodiment in FIG. 3 runs at first parallel to mounting rack 1 from outlet opening 24 in an upper section 31 of the pressure connection and then perpendicularly downward in connector 21. Connector 21 here passes through a passage 41 in mounting rack 1, so that inlet 22 of pressure channel 23 is accessible from the underside of mounting rack 1. Instead of the sealing ring in FIG. 1, FIG. 3 shows a cylindrically symmetrical sealing body 3 made of an elastic material inserted into a recess 26 on side 25 of the pressure connection facing mounting rack 1. Sealing body 3 has a central passage 37 projects with a funnel-shaped section away from pressure connection 2. When three locking pegs 28 are snapped into recesses 40 in mounting rack 1, the funnel-shaped section of sealing body 3 presses like a flange against top side 18 of sensor casing 15, so that the transition area between outlet 24 of pressure channel 23 and opening 13 is sealed. When pressure connection 2 shown in FIGS. 3 and 4 is produced as an injection molded part, a lateral gate valve is employed in the injection mold because of the section of pressure channel 23 running parallel to mounting rack 1. Opening 32 remaining in pressure channel 23 between section 31 and connector 21 after removal of the gate valve can then be sealed with an adhesive or a ball closure 33 or by caulking or some other method.

The pressure sensor device described above yields a very flat and stable design with inexpensive means. In securing a pressure tubing on connector 21, loading on the soldered joints between the terminals of sensor casing 12, 15 and the contact faces of the mountingy rack is prevented by the stable connection between pressure connection 2 and mounting rack 1. In manufacturing the pressure sensor device, first the sensor casing is advantageously soldered to the mounting rack and then the pressure connection is mounted. The pressure connection can therefore also be manufactured inexpensively from a material which is not resistant to the high temperatures in soldering.

What is claimed is:

1. A pressure sensor device, comprising:
   a mounting rack;
   a sensor casing arranged on the mounting rack and closed except for an opening;
   a pressure pickup arranged inside the sensor casing and electrically connected to the mounting rack; and
   a pressure connection that includes a connector and a pressure channel having an inlet and an outlet, wherein:
      the pressure connection is designed as a molded part produced independently of the sensor casing and securable on the mounting rack, and
      the outlet of the pressure channel designed on the molded part is connected at least indirectly to the opening in the sensor casing.

2. The pressure sensor device according to claim 1, further comprising:
   a sealing part that seals a transition area of the pressure channel into the sensor casing from the outside, the sealing part being arranged between the outlet of the pressure channel and the opening in the sensor casing.

3. The pressure sensor device according to claim 2, wherein:
   the pressure connection includes a recess surrounding the outlet of the pressure channel with the sealing part inserted into the recess.

4. The pressure sensor device according to claim 1, further comprising:
   a plurality of fastening devices provided on the pressure connection and for securing the pressure connection on the mounting rack.

5. The pressure sensor device according to claim 4, wherein:

the fastening devices are each designed as a locking device.

6. The pressure sensor device according to claim 5, wherein:

each locking device is capable of being engaged in a corresponding recess in the mounting rack in an insertion direction running perpendicular to a top side of the mounting rack provided with the sensor casing.

7. The pressure sensor device according to claim 1, wherein:

the opening in the sensor casing is arranged on a top side of the sensor casing facing away from the mounting rack, and the outlet of the pressure channel is designed on a section of the pressure connection facing the mounting rack.

8. The pressure sensor arrangement according to claim 2, wherein:

the sealing part is clamped between the sensor casing and the pressure connection when the pressure connection is connected to the mounting rack.

9. The pressure sensor device according to claim 8, wherein:

the pressure connection includes at least one elastically deformable spring arm that presses the sealing part against the sensor casing.

10. The pressure sensor device according to claim 1, wherein:

the connector of the pressure connection includes an angle bend and is passed through a passage in the mounting rack to an underside of the mounting rack facing away from the sensor casing.

11. The pressure sensor device according to claim 1, wherein:

the pressure connection is made of plastic.

12. A method of producing a pressure sensor arrangement, comprising the steps of:

mounting a sensor casing containing a pressure pickup on a mounting rack; and mounting a pressure connection on the mounting rack such that an outlet of a pressure channel formed on the pressure connection is connected at least indirectly to an opening in the sensor casing.

\* \* \* \* \*